(12) United States Patent
Gassmann et al.

(10) Patent No.: US 6,520,885 B2
(45) Date of Patent: Feb. 18, 2003

(54) ALL WHEEL DRIVE AXLE DISCONNECT DEVICE

(75) Inventors: Theodore Gassmann, Rochester, MI (US); Brent Peura, Farmington, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 09/775,140

(22) Filed: Feb. 1, 2001

(65) Prior Publication Data

US 2001/0032768 A1 Oct. 25, 2001

Related U.S. Application Data

(60) Provisional application No. 60/179,788, filed on Feb. 2, 2000.

(51) Int. Cl.$^7$ ............................ F16H 48/24; F16D 43/20
(52) U.S. Cl. ...................... 475/231; 192/46; 192/48.92; 192/54.5
(58) Field of Search .................... 475/231; 192/46, 192/48.6, 49, 54.5, 48.92

(56) References Cited

U.S. PATENT DOCUMENTS

| 3,448,636 | A | * | 6/1969 | Roper et al. ................. 475/231 |
| 4,558,770 | A | * | 12/1985 | Woodruff .................... 192/48.6 |
| 5,070,978 | A | * | 12/1991 | Pires ............................ 192/46 |
| 5,286,239 | A | * | 2/1994 | Ito et al. ....................... 192/49 |
| 5,699,889 | A | * | 12/1997 | Gadd ........................... 192/46 |
| 5,732,807 | A | * | 3/1998 | Itoh et al. .................. 192/48.6 |

FOREIGN PATENT DOCUMENTS

| JP | 64-4522 A | * | 1/1989 |
| JP | 64-49740 A | * | 2/1989 |

* cited by examiner

Primary Examiner—Rodney H. Bonck
(74) Attorney, Agent, or Firm—Mick A. Nylander

(57) ABSTRACT

An axle disconnect device for use in an all wheel drive vehicle. The axle disconnect device includes a one-way overrunning clutch and a spring contacting the clutch. A spline locking ring contacts the spring on an end opposite of the clutch. A friction dog spline engages the surface of the spline locking ring while a differential ramp ring contacts the friction dog spline. The axle disconnect device also includes a cover ramp engaging the differential ramp ring.

19 Claims, 4 Drawing Sheets

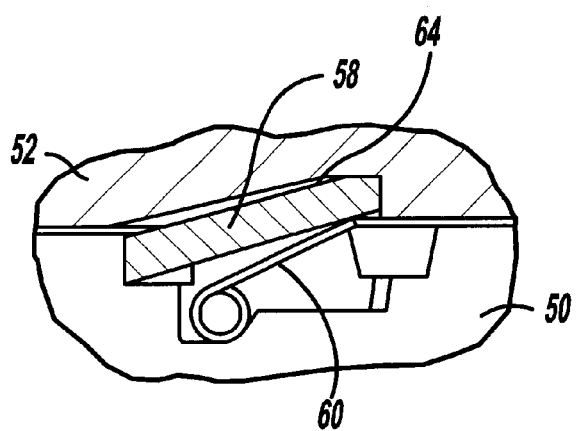
_Fig - 2_
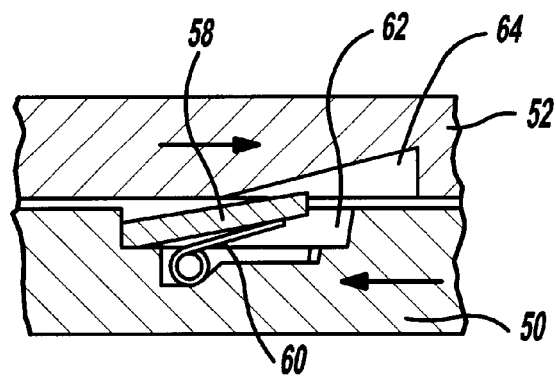
_Fig - 3_
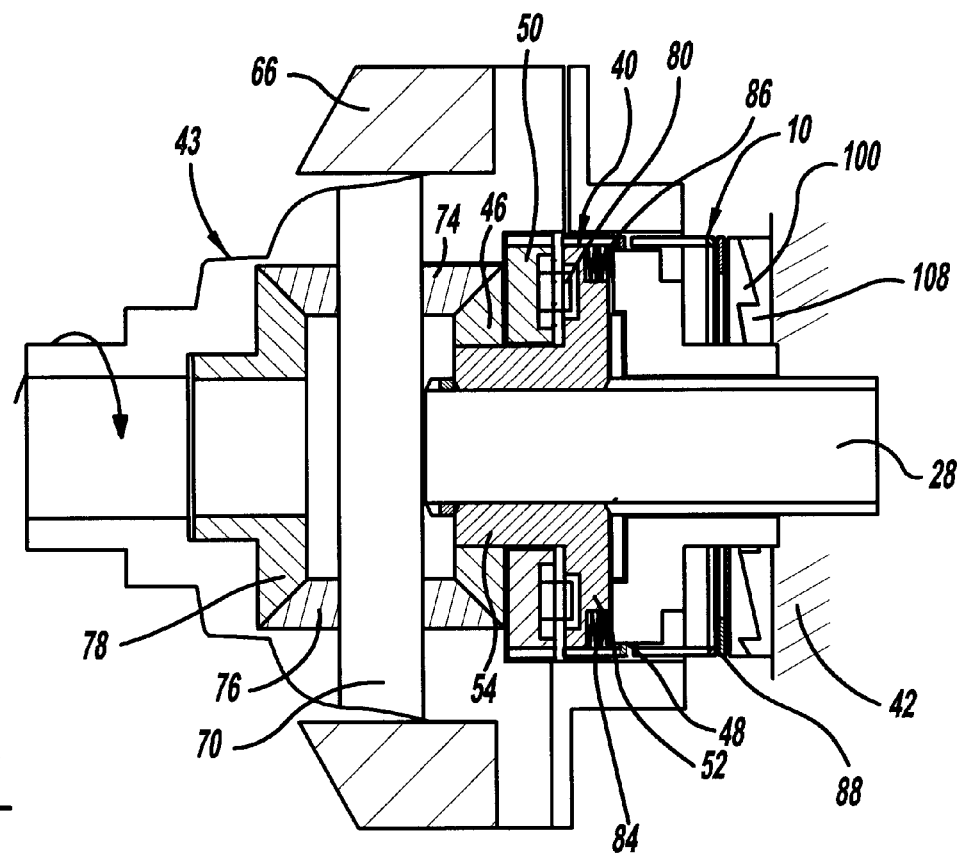
_Fig - 4_

ALL WHEEL DRIVE AXLE DISCONNECT DEVICE

This application claims the benefit of Provisional application Serial No. 60/179,788 filed Feb. 2, 2000.

TECHNICAL FIELD

The present invention generally relates to clutches, and more particularly, it relates to an overrunning clutch for use in an all wheel drive vehicle along with a disconnect device.

BACKGROUND ART

In a typical all wheel drive system a front axle is the primary drive, while torque to the rear axle is transferred if and when the average speed of the front wheels spin faster than the average speed of the rear wheels. The torque transfer generally occurs if the front wheels have excessive slip and it also can occur during cornering situations. A clutch works as a mechanical disconnect which prevents torque from being transferred to the rear axle or to the front axle when not desired. Currently known in the prior art are single directional clutches and bidirectional overrunning clutches and clutches that use hydraulic systems to effect changes thereon. The bidirectional overrunning clutch differs from a single directional clutch because it works in both the clockwise and counterclockwise rotation directions. A single directional overrunning clutch is in the overrun mode when the rear axle housing is spinning faster than the front axle housing. This overrun occurs between the two clutch components in the forward vehicle direction when no front wheel slip is present. However, in a single directional overrunning clutch when front wheel slip is encountered during road conditions the axle ratio is overcome in the rear axle and the input side of the clutch drives the output side of the clutch thus delivering torque to the rear wheels until the speed difference between the rear axle and front axle is reduced. Generally speaking the single directional clutch has a torque flow of 50/50 when it uses a bevel gear set. The bevel gear set is engaged when the overrunning single directional clutch is used in combination with an axle ratio offset whenever the primary axle speed is equal to is greater than the secondary axle speed. This usually is the case when front wheel slip occurs for a primary front wheel drive vehicle, and rear wheel slip in a primary rear wheel drive vehicle.

However, problems have occurred with prior art devices that use single directional clutches because the single directional overrunning clutch is oriented only for forward rotation of the axis and an entirely different device is needed for the reverse direction to have a properly operating all wheel drive vehicle. Therefore, whenever a vehicle is put into the reverse direction, the single directional overrunning clutch would never engage and torque would never be transmitted through the rear axle which is the preferred axle to have as the primary drive axle when an all wheel drive vehicle is moving in a reverse direction. Therefore, prior art devices attach an extra housing and/or electronic devices to ensure that the rear axle delivered torque during reverse motion of an all wheel drive vehicle. This may increase costs, weight and reliability of the all wheel drive systems and furthermore increase noise, vibration and harshness issues for the operator of the all wheel drive vehicle.

Therefore, there is a need in the art for a one way overrunning clutch mechanism that works in unison with a disconnect device, such that when the reverse gear is chosen the reverse differential will be able to transmit torque thus providing superior handling and power.

BRIEF SUMMARY OF THE INVENTION

One object of the present invention is to provide a novel all wheel drive axle disconnect device.

Another object of the present invention is to provide a torque transfer device that is capable of disengaging when used in a conventional 50/50 split drive train.

Yet a further object of the present invention is to provide a disconnect device for use in an all wheel drive vehicle that requires minor modification to the existing axle housing.

Still another object of the present invention is to provide an axle disconnect device that has reduced weight and smaller packaging issues for an all wheel drive vehicle.

Yet a further object of the present invention is to provide an axle disconnect device that has torque transfer when operating in a reverse direction.

To achieve the foregoing objects and axle disconnect device for use with an all wheel drive vehicle includes a one-way overrunning clutch. The axle disconnect device also includes a spring contacting the clutch on one end. A spline locking ring is then in contact with the spring on an end opposite to that of the clutch. The axle disconnect device also includes a friction spline that engages a surface of the spline locking ring. The axle disconnect device further includes a differential ramp ring which contacts the friction spline. Finally, the axle disconnect device includes a cover ramp which engages the differential ramp ring such that when the differential ramp ring and the cover ramp interact with one another an axial force is created.

One advantage of the present invention is that the axle disconnect device will be able to be used in a conventional 50/50 all wheel drive vehicle.

A further advantage of the present invention is that the conventional 50/50 split of an all wheel drive vehicle is retained while the torque transfer device is installed in the differential carrier.

A further advantage of the present invention is that the axle disconnect device requires no major modifications to the existing axle housing of the vehicle.

A further advantage of the present invention is that the axle disconnect device will reduce the weight of the drive train.

Yet a further advantage of the present invention is that the axle disconnect device will optimize packaging issues for the drive train of the all wheel drive vehicle.

Still a further advantage of the present invention is that the axle disconnect device will work in harmony with an overrunning clutch to provide all wheel drive in a forward direction and proper torque application when an all wheel drive vehicle is placed in a reverse direction.

Other objects, features, and advantages of the present invention will become apparent from the subsequent description and appended claims taken in conjunction with the accompanying drawings.

BRIEF DESCRIPTION OF THE DRAWINGS

FIG. 2 shows a cross section of a one-way overrunning clutch and components in an engaged position.

FIG. 3 shows a side view of a one-way clutch in a locked orientation position.

FIG. 4 shows an axle differential with a one-way overrunning clutch and reverse spline locking device in forward over run condition.

DESCRIPTION OF THE PREFERRED EMBODIMENT(S)

Figure 1:
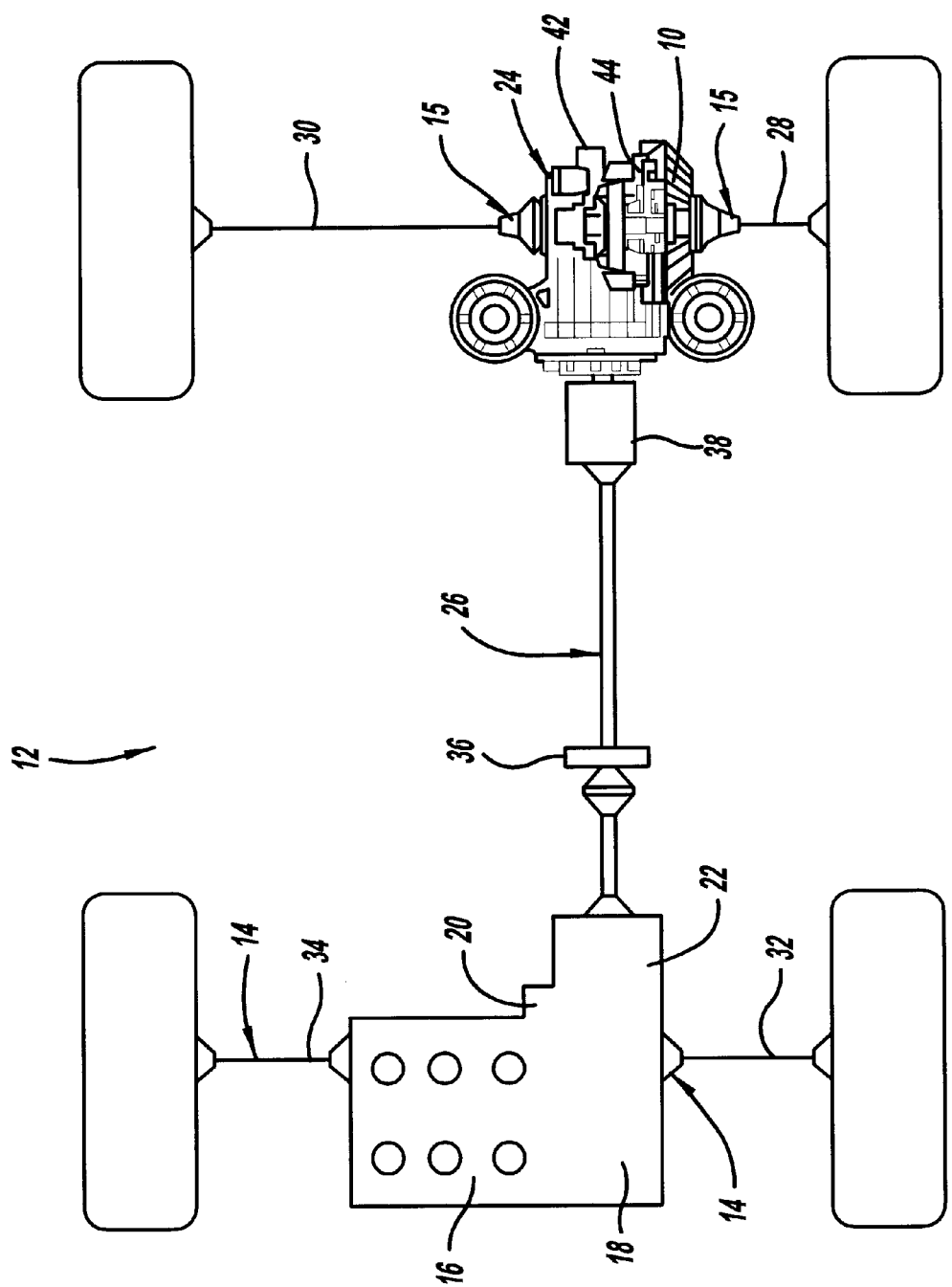
FIG. 1 shows a drive line layout of a primary front wheel drive vehicle with the hang-on axle half shaft disconnect device.

Referring to the drawings, an all wheel drive axle disconnect device 10 according to the present invention is shown. FIG. 1 schematically shows an all wheel drive or four wheel drive motor vehicle 12 that is primarily a front wheel drive vehicle. However, the present invention can also be used on a primarily rear wheel driven vehicle.

The vehicle 12 as shown in FIG. 1 is primarily driven by a halfshaft assembly system 14. The motor vehicle 12 is an all wheel drive or four wheel drive vehicle which is driven by power transferred from the engine 16 through a transaxle or gear box 18, which may be an automatic or manual gear box, and to the front differential 20 of the drive train assembly and finally on through to the power takeoff unit 22. In an all wheel drive vehicle power is delivered to the rear differential 24 via propeller shaft or driving shaft 26 when there is a demand for it. At the rear differential 24 power is split to a left hand rear side or half shaft 28 and a right hand rear side or half shaft 30 for distribution to the wheels at the rear of the vehicle. The front differential 20 splits power and slip or spin between the left hand front side shaft 32 and the right hand front side shaft 34. An all wheel drive vehicle distributes power to both the rear differential 24 and the front differential 20 via a distributing drive or center bearing 36. In a traditional all wheel drive vehicle configuration either the front halfshaft assembly system 14 or rear halfshaft assembly system 15 is a primary driven axle with the other axle only receiving most of the power when needed. A viscous transmission 38 is located directly in front of the rear differential 24 to smooth any sudden torque transfers that occur in the rear differential 24 either in the forward or reverse direction. The preferred embodiment of the present invention is an all wheel drive vehicle that is primarily front wheel drive and includes a one-way overrunning clutch 40 with an axle disconnect device 10 located within or near the rear differential 24 as shown in FIG. 4. This one-way overrunning clutch 40 and axle disconnect device 10 acts from the rear differential 24 to distribute torque to the rear half shafts 28, 30 of the vehicle during front wheel spin conditions and general forward and reverse motion of the all wheel drive vehicle. However, it should be noted that a primary driven rear axle may also be used with the one-way overrunning clutch and axle disconnect device 10 installed at or near the front differential of such a vehicle.

The drive train of the vehicle shown in FIG. 1 includes a propeller shaft 26 which transmits power from the power take off unit 22 through propshaft 26 to the rear differential 24. The rear differential 24 includes an axle or other housing 42 which includes a differential housing 44 therein which is supported about a rotational axis. The differential housing 44 is driven by a vehicle gear box via a pinion shaft driving gear. The viscous coupling 38 is connected between the prop shaft 26 and the rear differential 24 is used in series to absorb shock loads as well as to provide a reduced amount of cornering drag when turning the vehicle 12. The axle disconnect device 10 is located within or near the differential 24. Axle disconnect device 10 incorporates an axle ratio offset such that under normal driving conditions the rear differential 24 will rotate slower than the front differential 20. Use of the differential 24 and axle disconnect device 10 in cooperation provides a parallel connection between one of the differential side gears 46 and the corresponding half shaft 28 to that side gear as shown in FIG. 4. The axle disconnect device 10 according to the present invention generally has two main components. The first is a one-way overrunning clutch 40 which over runs or disconnects during forward wheel rotation under normal driving conditions due to the off set axle ratio between the front and rear differentials. The one-way overrunning clutch 40 locks during any front wheel slip conditions because the forward differential 20 spins faster than the rear differential 24 thus engaging the clutch 40 and providing torque to the rear wheels. The other component of the axle disconnect device 10 of the present invention is a spline locker 48, which engages whenever the vehicle and the wheels rotate in the reverse direction.

The one-way overrunning clutch 40 of the present invention shown in FIGS. 2 and 3 is a diode or axial strip clutch. However, it should be noted that any other type of one-way clutch may be used such as a sprag, pawl or a roller clutch. The one-way overrunning clutch 40 of the preferred embodiment includes a pocket plate 50 and a notch plate 52 wherein the pocket plate 50 and notch plate 52 mate with each other such that the notch plate 52 has an appendage 54 that mates with an orifice 56 of the pocket plate 50 to create a single rotatable unit. A series of struts 58 and springs 60 are located along a surface of the pocket plate 50 which allow for interaction and engagement with a surface of the notch plate 52. The pocket plate 50 includes a plurality of pockets 62 arranged in a circumferential manner on a surface of the pocket plate 50. The struts 58 are secured within the pockets 62 of the pocket plate 50 and have a spring 60 located beneath the strut 58 such that the end of the strut 58 will protrude past the surface of the pocket plate 50 due to the urging of the spring force. A surface of the notch plate 52 includes a plurality of recesses 64 that are located at the same radius as the pockets 62 of the pocket plate. When the notch plate 52 and the pocket plate 50 mate with each other these recesses 64 interact with the pockets, 62 struts 58 and springs 60. When the pocket plate 50 and the notch plate 52 are rotated in the same direction at the same speed, i.e., a condition that occurs during front wheel slip in a primary front wheel driven vehicle, the struts 58 will engage with the notches or recesses 64 in the notch plate and lock the unit thus providing transmission of torque to the rear half shafts 28, 30 of the rear differential 24 of the all wheel drive vehicle. FIG. 2 shows a one-way clutch 40 in its locked torque transmission position. FIG. 3 shows the pocket plate 50 being rotated at a slower speed then the notch plate 52, i.e., an over run condition, the struts 58 will click past the notch recesses 64 and provide no transmission of torque to the rear differential 24. It should be noted that a small amount of drag torque is found because the struts 58 do not lock in the pockets 62 but are constantly being urged out by the spring. Thus creating a small drag force between the pocket plate 50 and the notch plate 52.

Figure 5:
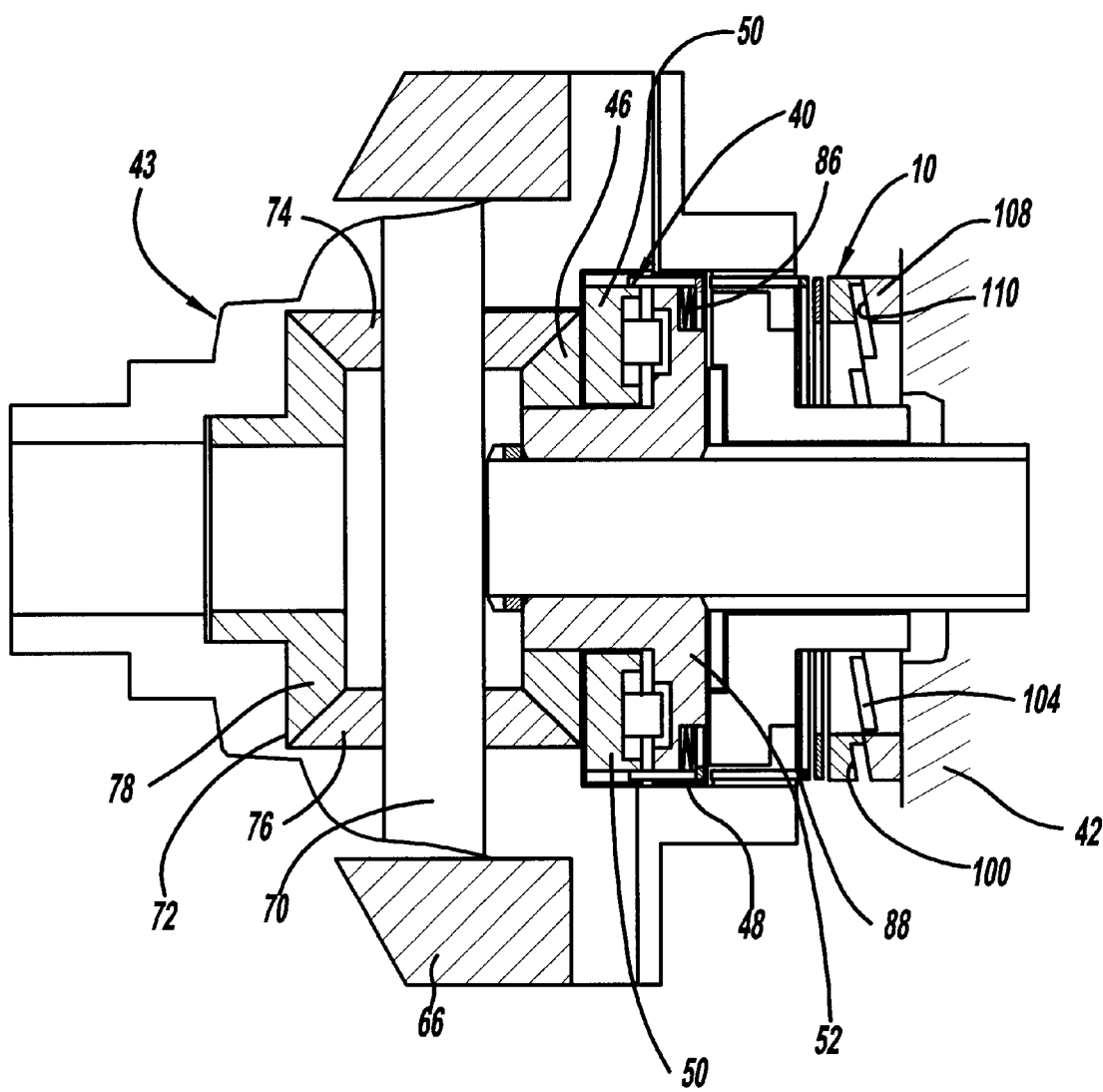
FIG. 5 shows a reverse spline locking device in reverse locked condition.
Figure 6:
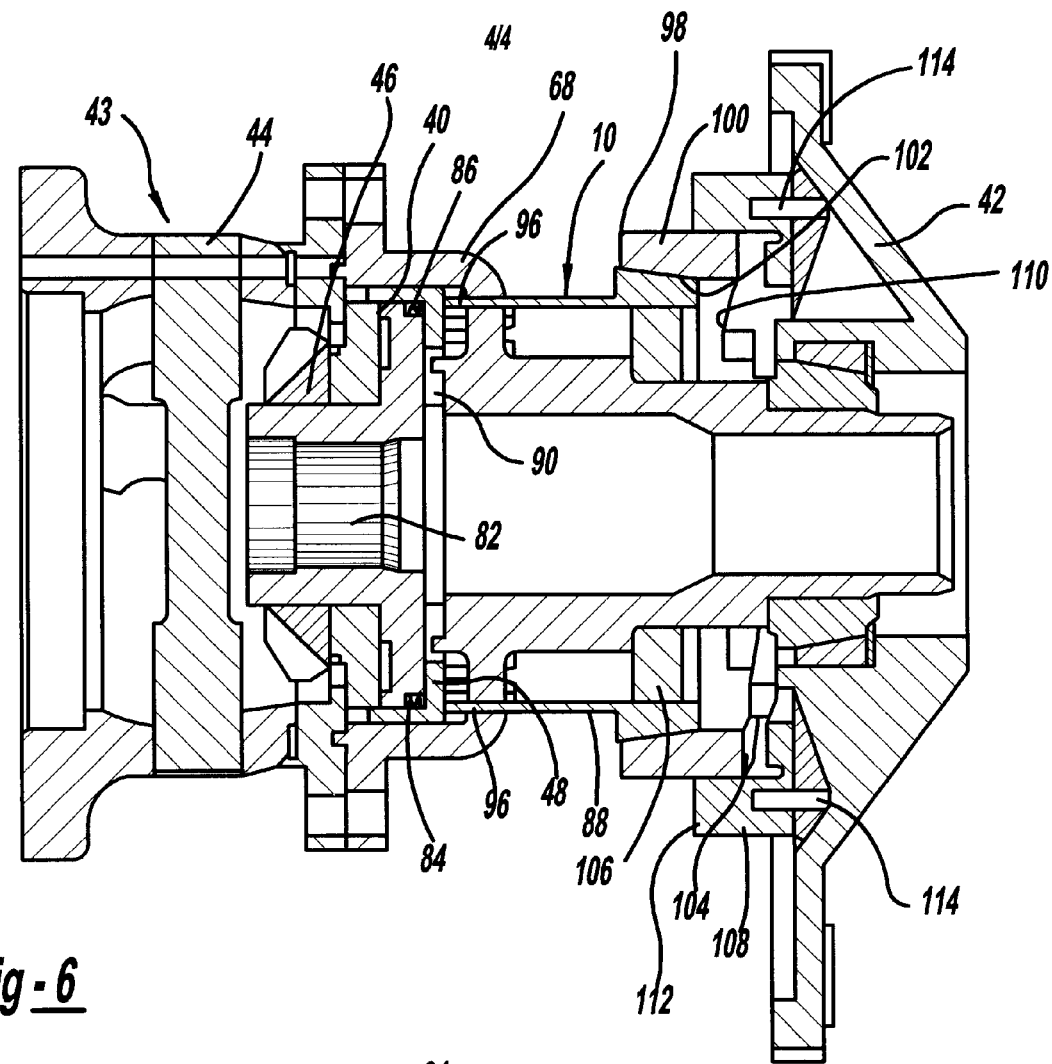
FIG. 6 shows a cross sectional view of the axle disconnect device according to the present invention.

As shown in FIGS. 4 through 6 one of the clutch plates, i.e., the notch plate 52, is connected to the side gear 46 of the differential while the other plate, the pocket plate 50, is connected to the corresponding axle half shaft 28. This allows for over run between the notch plate 52 and pocket plate 50 of the clutch when the rear axle housing 42 is spinning faster than the front axle housing in the forward vehicle direction and no wheel slip is present. However, when front wheel slip is present the axle ratio is overcome and the input side of the one-way overrunning clutch 40 drives the output side thus providing torque to the rear wheels.

FIGS. 4 through 6 show the axle disconnect device 10 in a forward differential housing rotation motion FIG. 4 and the reverse differential housing rotation motion FIG. 5. The axle disconnect device 10 is located within the axle housing 42 of the rear differential 24 in the preferred embodiment. However, it should be noted that if the all wheel drive vehicle is primarily rear wheel driven then the axle disconnect device 10 would be located at or near the front differential of the vehicle. Axle housing 42 is adjacent to a left hand rear half shaft 28 and a right hand rear side shaft 30. Each of the half shafts connects to a rear wheel of the vehicle. The axle housing 42 may have a viscous coupling 38 located directly in front of it between the prop shaft 26 and the rear axle 15 to provide for smooth transitions when torque is being transmitted to the rear axle. A differential 43 is rotatably supported within the axle housing 42.

The differential 43 includes a ring gear 66 on the outer surface of the differential housing 44. The ring gear 66 is engaged by a driving gear which is found on the pinion shaft of the rear axle 15. The differential 43 generally includes a differential housing 44 and may include on one end thereof a cover 68 for the differential housing 44. A bearing pin 70 is rotatably arranged within the differential housing 44. A differential gear set 72 is at least in part connected to the bearing pin 70. The differential gear set 72 includes a first 74 and a second planet gear 76 connected to the bearing pin 70. The differential gear set 72 further includes a first 46 and a second side gear 78 that engages the planet gears 74, 76 and further engage a rear right hand half shaft 30 and a rear left hand half shaft 28. The axle disconnect device 10 has a one-way overrunning clutch 40 contacting one of the side gears 46 of the differential gear set 72. The one-way overrunning clutch 40 includes a pocket plate 50 and a notch plate 52 as described above. The pocket plate 50 has one of the side gears 46 connected to one of its surfaces. The one-way overrunning clutch 40 also includes a notch plate 52 that is nestled or mated within an orifice 80 of the pocket plate 50. The notch plate 52 generally has a ring like body and an appendage 54 extending from one end thereof. The notch plate 52 has a plurality of teeth 82 on an inner circumferential surface and these teeth mate with teeth on a half shaft 28 and physically connect the half shaft 28 to the notch plate 52 of the clutch mechanism.

Figure 7:
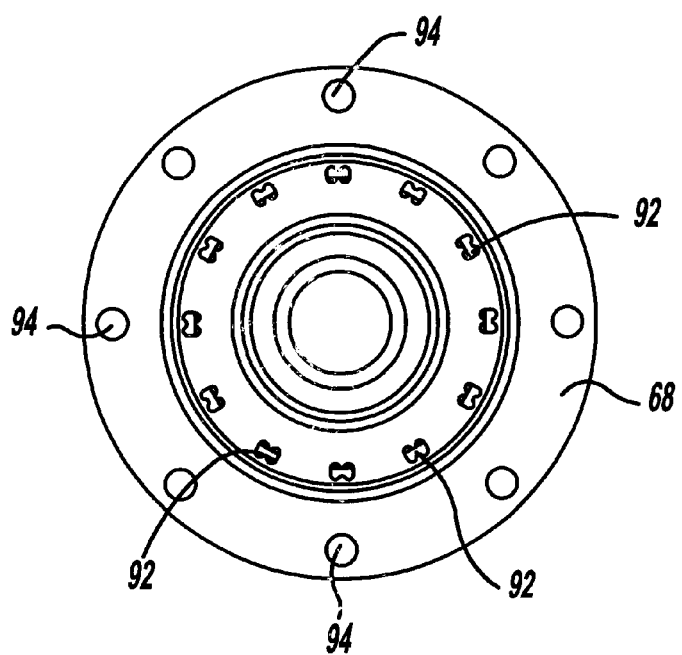
FIG. 7 shows a side view of the differential housing according to the present invention.

The one-way overrunning clutch 40 operates as described above with relation to forward rotation and reverse rotation of the drive train of the automotive vehicle. The notch plate 52 includes a ring like groove 84 on an outer periphery of its ends. A return spring 86 which is located within the groove 84 and contacts the surface of the notch plate 52. A spline locking ring 48 is axially located adjacent to the notch plate 52 of the clutch. the spline locking ring 48 generally has a ring like appearance and an L-shaped cross section on one end thereof The spline locking ring 48 also contacts the friction spline 88 on an end opposite to the notch plate 52. The spline locking ring 48 will serve to compress the clutch 40 and lock it when the vehicle is placed in a reserve motion. The spring 86 is used to urge the spline locking ring 48 in an axial direction away from the notch plate 52 of the clutch thus allowing the clutch to properly operate as an overrunning clutch when the vehicle is in a forward direction and to engage torque and hence rear wheel traction when a slip condition occurs on the front wheels. A thrust washer 90 is placed adjacent to an outside surface of the notch plate 52 of the clutch mechanism and also engages the inside surface of the differential housing cover 68. The differential housing cover 68 connects to the differential housing 44 on the end adjacent to the axle disconnect device 10. As shown in FIG. 7 the differential housing cover 68 has a plurality of orifices 92. The orifices 92 are arranged in a circumferential pattern on an inside periphery of the differential cover 68. The differential cover 68 is secured to the differential body 44 through mating orifices 94 and with any known securing device.

The friction spline 88 which generally has a cylindrical shape contacts an outside surface of the spline locking ring 48. The friction spline 88 has a plurality of appendages 96 that extend from one end of the spline. The appendages 96 pass through the orifices 92 of the differential cover and engage the spline locking ring 48 on its outside surface. The friction spline 88 on an end opposite of the appendages has a contact surface 98 on an outer periphery thereof. The contact surface 98 is capable of creating a friction type engagement and causing axial motion of the friction spline 88. A support ring 106 is located between an outside surface of the differential housing cover 68 and an inside surface of the friction spline 88. This support ring 106 will provide support to the friction spline 88 when the axle disconnect device 10 is in operation.

A differential ramp ring 100 generally has a ring like appearance and is in contact with the outside contact surface 98 of the friction spline 88. The differential ramp 100 ring has an angled contact surface 102 which mates with the contact surface 98 of the spline locking ring on an inside surface thereof. The differential ramp ring 100 also has on the outer edge a plurality of ramp surfaces 104 which are at a predetermined angle to allow for a predetermined amount of axial movement by the differential ramp ring 100. A cover ramp 108 which in the preferred embodiment is made of a tetrafluoroethylene material, however it should be noted that any other type of plastic, ceramic or other type of compound or coating may be used for the cover ramp. The cover ramp 108 generally has a ring like appearance and includes a plurality of ramp surfaces 110 on tone end thereof. The ramp surfaces 110 of the cover ramp 108 engage and interact with the ramp surfaces 104 of a differential ramp ring 100. The cover ramp 108 also includes a body portion 112 that engages an outer surface of the differential ramp ring 100. The cover ramp 108 includes a plurality of orifices which receive a pin 114 or other device used to secure the cover ramp 108 to the axle housing 42. The cover ramp 108 is secured to the axle housing 42 via the pins 114 which allows for rotational movement between the differential ramp ring 100 and the cover ramp 108 while having the cover ramp stationary in a secured non-rotatable position with respect to the axle housing 42.

In operation the axle disconnect device 10 or axle disconnect system works in harmony with the front differential 20 and the rear differential 24 to provide in the forward direction an overrunning clutch that will hang on and produce a small amount of drag friction until the front wheels slip. The slip conditions occur when the road is covered by ice, water or mud, etc., or during cornering of the all wheel drive vehicle which requires one wheel to spin faster than the other and during such slip conditions the overrunning clutch 40 will have the struts 58 engaged with the recesses 64 of the clutch 40. Any of these slip conditions, on a primary driven front wheel vehicle, will cause the rear axle housing to spin faster than the front axle housing thus engaging the two clutch components with each other and providing torque to the rear wheels of the all wheel drive vehicle until the front axle housing rotates at the same speed of the rear housing. When the speeds are equal this disengages the clutch and allows for the rear axle to work in a 50/50 combination for the all wheel drive vehicle. It should be noted that other splits in power of the all wheel drive vehicle are possible such as 60/40, 20/30, 40/60, 90/10, etc. However, when the vehicle is placed in reverse by the operator the one-way clutch 40 is orientated for forward rotation and another device is needed for the reverse direction to allow for proper all wheel drive performance of the drive line.

The axle disconnect device 10 of the current invention as shown in FIGS. 4 and 5 is used to lock the rear differential 24 when the vehicle is places in reverse. When the vehicle is in the forward direction see FIG. 4, the friction between the differential ramp ring 100 and the friction spline 88 creates an axial force which allows the differential ramp ring 100 and the cover ramp 108 to be at their smallest width. This occurs when the differential ramp ring 100 and the cover ramp 108 are at the base of each other and form a solid ring. However, when the operator chooses to reverse the direction for the all wheel drive vehicle, the differential 44 will rotate in the reverse direction as shown in FIG. 5, and the friction between the friction spine 88 and the differential ramp ring 100 will rotate the differential ramp ring 100 with respect to the cover ramp 108 which is stationary, i.e., grounded, to the axle housing 42. This rotation of the differential ramp 100 ring with relation to the cover ramp 108 will increase the width of the differential ramp ring 100 and the cover ramp 108 thus creating an axial force or movement. This increase in the axial forces or width of the differential ramp ring 100 will act on the friction spine 88 which will create an axial movement into the spine locking ring 48 which will be urged towards side gear 46 connected to the pocket plate 50 of the one-way overrunning clutch 40. This movement of the spline locking ring 48 will engage a plurality of grooves on the pocket plate 50 and lock the differential side gear 46 with the side half shaft 28 of the rear axle. This then forces the rear differential in reverse to function as a normal open bevel gear differential and transmit torque to both the rear wheels during reverse direction of the vehicle. There does not have to be slip of the front wheels, the torque is primarily supplied to the rear wheels which is optimal for any rear towing or rear vehicle direction in all wheel drive vehicles. It should be noted that the disconnect device 10 of the present invention is generally for use on a secondary drive axle with a gear ratio offset from approximately 0 to 10% in the primary drive axle. However, it should be noted that a gear ratio offset greater than 10% may also be used depending on the operating environment and design needs of the all wheel drive vehicle.

The present invention has been described in an illustrative manner. It is to be understood that the terminology which has been used is intended to be in the nature of words of description rather than of limitation. Any modifications and variations of the present invention are possible in light of the above teachings. Therefore, within the scope of the appended claims, the present invention may be practiced otherwise than as specified described.

What is claimed is:

1. An axle disconnect device, said device including:
   a one-way overrunning clutch;
   a spring contacting said one-way overrunning clutch;
   a spline locking ring contacting said spring on an end opposite of said one-way overrunning clutch;
   a friction spline engaging a surface of said spline locking ring;
   a differential ramp ring contacting said friction spline; and
   a cover ramp engaging said differential ramp ring, said ramps interact and develop an axial force that moves said friction spline into said spline locking ring during predetermined conditions.

2. The device of claim 1 wherein said one-way over running clutch includes a notch plate and a pocket plate.

3. The device of claim 1 wherein said spring urges said spline locking ring into a disengaged position.

4. The device of claim 1 wherein said spline locking ring locks said one-way over running clutch when a predetermined direction of rotation is sensed.

5. The device of claim 1 wherein said differential ramp ring having a plurality of ramps arranged on a surface thereof.

6. The device of claim 5 wherein said cover ramp having a plurality of ramps on a surface thereof, said ramps of said cover ramp engage and interact with said ramps of said differential ramp ring.

7. An axle disconnect device, said device including:
   a one-way overrunning clutch;
   a spring contacting said one-way overrunning clutch;
   a spline locking ring contacting said spring on an end opposite of said one-way overrunning clutch;
   a friction spline engaging a surface of said spline locking ring;
   a differential ramp ring contacting said friction spline; and
   a cover ramp engaging said differential ramp ring, said cover ramp is made of a tetrafluoroethylene material.

8. The device of claim 1 wherein said cover ramp and said differential ramp ring have a friction based connection.

9. An axle disconnect system for use in a vehicle drive train, said axle disconnect system including:
   an axle housing having a cover thereon;
   a differential rotatably supported within said axle housing;
   an overrunning clutch located within said differential;
   a spline locking ring adjacent to said overrunning clutch;
   a friction spline engaging a surface of said spline locking ring;
   a differential ramp ring contacting said friction spline; and
   a cover ramp engaging said differential ramp ring, said cover ramp secured to said cover of said axle housing.

10. The axle disconnect system of claim 9 wherein said differential having a differential gear set rotatably supported therein.

11. The axle disconnect system of claim 10 wherein said overrunning clutch engages said differential gear set and an axle shaft.

12. The axle disconnect system of claim 9 wherein said differential having a plurality of orifices on one end thereof.

13. The axle disconnect system of claim 12 wherein said friction spline having a plurality of appendages on one end thereof, said appendages extend through said orifices and provide said engagement with said spline locking ring.

14. The axle disconnect system of claim 9 wherein said differential ramp ring having a plurality of ramps arranged on a surface thereof.

15. The axle disconnect system of claim 14 wherein said cover ramp having a plurality of ramps arranged on a surface thereof.

16. The axle disconnect system of claim 15 wherein said ramps of said cover ramp and said differential ramp ring interact with each other to create an axial movement.

17. The axle disconnect system of claim 16 wherein said differential having a reverse rotation, axially separates said cover ramp and said differential ramp ring, which axially moves said friction spline into said spline locking ring and locks a side gear of said differential to a shaft.

18. The axle disconnect system of claim 16 wherein said differential having a forward rotation will disengage said spline locking ring and allow said overrunning clutch to over run until a slip condition is present.

19. An all wheel drive system for use in a vehicle, the vehicle having a half shaft and a pinion shaft, said system including:

a housing;

a differential housing rotatably supported within said housing, said differential housing having a plurality of orifices on one end thereof;

a ring gear arranged on an outside surface of said differential housing, said ring gear engaging the pinion shaft;

a differential gear set rotatably supported within said differential housing, said differential gear set having a planet gear and a side gear;

an overrunning clutch having a first plate and a second plate, said first plate connected to said side gear and said second plate connected to the half shaft;

a spring contacting said second plate;

a spline locking ring contacting said spring on an end opposite of said second plate;

a friction spline having a plurality of appendages extending from one end thereof, said plurality of appendages extend through said plurality of orifices of said differential housing, said appendages engage said spline locking ring;

a differential ramp ring contacting said friction spline, said differential ramp ring having a plurality of ramp surfaces on one end thereof; and a cover ramp ring secured to said housing and engaging said differential ramp ring, said cover ramp ring having a plurality of ramp surfaces, said ramp surfaces of said cover ramp interact with said ramp surfaces of said differential ramp ring to provide axial motion.

\* \* \* \* \*

UNITED STATES PATENT AND TRADEMARK OFFICE
CERTIFICATE OF CORRECTION

PATENT NO. : 6,520,885 B2
DATED : February 18, 2003
INVENTOR(S) : Theodor Gassmann et al.

It is certified that error appears in the above-identified patent and that said Letters Patent is hereby corrected as shown below:

Column 5,
Line 47, after "of" insert -- one of --
Line 51, delete the second "the" and insert -- The --
Line 53, after "thereof", insert -- . --

Column 6,
Line 36, after "on", delete "tone" and insert -- one --

Signed and Sealed this

Ninth Day of December, 2003

JAMES E. ROGAN
*Director of the United States Patent and Trademark Office*